(12) United States Patent
Cieślikowski et al.

(10) Patent No.: US 9,004,261 B2
(45) Date of Patent: Apr. 14, 2015

(54) BEAD FEEDING METHOD AND BEAD FEEDER

(71) Applicant: International Tobacco Machinery Poland Sp. z.o.o., Radom (PL)

(72) Inventors: Bartosz Cieślikowski, Radom (PL); Jacek Figarski, Radom (PL); Radoslaw Figarski, Radom (PL); Kazimierz Makosa, Radom (PL)

(73) Assignee: International Tobacco Machinery Poland Sp. z o.o., Radom (PL)

( * ) Notice: Subject to any disclaimer, the term of this patent is extended or adjusted under 35 U.S.C. 154(b) by 0 days.

(21) Appl. No.: 13/735,006

(22) Filed: Jan. 6, 2013

(65) Prior Publication Data

US 2013/0180828 A1    Jul. 18, 2013

(30) Foreign Application Priority Data

Jan. 18, 2012    (PL) .......................................... 397840

(51) Int. Cl.
*B65G 37/00*    (2006.01)
*A24D 3/02*    (2006.01)

(52) U.S. Cl.
CPC .............. *B65G 37/00* (2013.01); *A24D 3/0216* (2013.01)

(58) Field of Classification Search
USPC ............... 198/479.1, 443, 392; 221/263, 121, 221/122, 123, 277, 87, 88, 112
See application file for complete search history.

(56) References Cited

U.S. PATENT DOCUMENTS

| 3,370,514 | A  | * | 2/1968  | Rome ............................ 493/41 |
| 7,381,175 | B2 | * | 6/2008  | Dawson et al. ................. 493/47 |
| 7,757,835 | B2 | * | 7/2010  | Garthaffner et al. .......... 198/392 |
| 7,833,146 | B2 | * | 11/2010 | Deal .............................. 493/49 |
| 7,975,877 | B2 |   | 7/2011  | Garthaffner |
| 8,303,474 | B2 | * | 11/2012 | Iliev et al. ...................... 493/47 |
| 8,381,947 | B2 | * | 2/2013  | Garthaffner et al. ........... 221/72 |
| 2004/0020554 | A1 |   | 2/2004 | Smith et al. |
| 2010/0099543 | A1 |   | 4/2010 | Deal |
| 2013/0180827 | A1 | * | 7/2013 | Cieslikowski et al. .... 198/479.1 |
| 2013/0181003 | A1 | * | 7/2013 | Cieslikowski et al. ........... 221/1 |
| 2014/0011652 | A1 | * | 1/2014 | Cieslikowski et al. ......... 493/39 |

FOREIGN PATENT DOCUMENTS

WO    2009071271 A1    6/2009
WO    2009071272 A1    6/2009

OTHER PUBLICATIONS

Polish Search Report in priority application No. P.397840 mailed May 24, 2012.

* cited by examiner

*Primary Examiner* — William R Harp
(74) *Attorney, Agent, or Firm* — Oppedahl Patent Law Firm LLC (57) ABSTRACT

A method and device for feeding beads in a tobacco industry system including a bead container, a bead feeding unit having a plurality of channels for supplying a plurality of bead streams, a unit for transferring the beads to the filter material, where the beads are fed from holding pockets of the bead feeding unit to receiving pockets of the bead transfer unit, in which the beads are supplied from the bead container to a plurality of channels of the bead feeding unit which form holding pockets; the beads are fed from the holding pockets of the bead feeding unit to the receiving pockets of the bead transfer unit and to a delivery wheel by a movable feeding device; the beads are picked up from the receiving pockets by a movable guiding device.

16 Claims, 9 Drawing Sheets

BEAD FEEDING METHOD AND BEAD FEEDER

BACKGROUND

The object of the invention is a method and a device for feeding beads used in the filters of the tobacco industry products, particularly for cigarettes.

This invention concerns the feeding of spherical or oval objects which are subsequently placed into the filter material. For reasons of simplification, such objects will be hereinafter referred to as beads. Known products on the market are cigarettes the filters of which are provided with beads containing aromatic or flavour substances. The substances contained in the beads are released during smoking or yet before lighting up a cigarette by squeezing the filter resulting in crushing of the bead.

A difficult and very significant problem is the feeding of individual beads to a machine forming filters at great speeds in a way which guarantees that the beads remain undamaged and a high feeding efficiency is maintained, i.e. each manufactured filter actually contains a bead.

In known bead feeders, channels for feeding the beads to the area from which they are transferred to a bead delivery wheel are used, with the function of the said wheel to place the delivered beads into the filter material.

In the U.S. Pat. No. 7,975,877 B2 a bead feeder is disclosed in which the bead feeding unit is provided with a plurality of radially arranged channels connected with a bowl, where the channels rotate with the bowl, and the beads are picked up by vacuum transfer by a bead transfer wheel from pockets situated at the outlets of the channels, and then transferred to a bead delivery wheel. Feeding of the beads to the pockets at the ends of radially arranged channels is based on the centrifugal force and does not guarantee a high feeding efficiency.

The document WO 2009/071271 has disclosed a bead feeder in which the bead feeding unit is provided with passageways rotating with the bowl, where the beads are fed to a bead delivery wheel after separating the lowermost bead from those situated above it using a stationary arched wedge-ended element.

The document WO 2009/071272 has disclosed a similar bead feeder, where the beads are fed to a bead delivery wheel using two plates having a plurality of openings and rotating relative to each other, and a bead is fed after aligning respective openings directly on top of each other.

The U.S. Pat. No. 7,833,146 B2 shows a device for feeding beads by curved channels from a bowl directly to a bead delivery wheel, where the channels rotate with the bead bowl, and the beads are picked up from the bowl by vacuum transfer.

SUMMARY

The objective of the invention is to develop an improved device for feeding beads to a filter forming machine, supplied through stationary channels, which will render bead feeding at speeds bigger than in known devices possible.

The subject matter of the invention is a method of feeding beads in a tobacco industry system comprising a bead container, a bead feeding unit provided with a plurality of channels for feeding a plurality of bead streams, a unit for transferring beads into the filter material, whereas beads are transferred from holding pockets of the bead feeding unit to receiving pockets of the bead transfer unit in which beads are supplied from the bead container to a plurality of channels of the bead feeding unit comprising holding pockets; beads from the holding pockets of the bead feeding unit are fed to the receiving pockets of the unit for transferring the beads to a delivery wheel, by means of movable feeding means; beads are picked up from the receiving pockets by means of movable guiding means.

A method according to the invention is characterized in that beads are supplied by means of movable feeding means in the form of a cam.

A method according to the invention is characterized in that beads are picked up by means of a feeding unit in the form of a guiding plate.

A method according to the invention is characterized in that speed $\omega 1$ of movable feeding means of the bead feeding unit is greater than speed $\omega 2$ of movable guiding means of the bead transfer unit.

A method according to the invention is characterized in that the ratio of the speeds $\omega 1$ to $\omega 2$ is equal to the ratio of the distance s1 between adjoining holding pockets to the distance s2 between adjoining receiving pockets.

A method according to the invention is characterized in that the ratio of the speeds $\omega 1$ to $\omega 2$ equal to the ratio of the distance s1 between the holding pockets to the distance s2 between the receiving pockets is equal to an integer.

A method according to the invention is characterized in that the channels supplying a plurality of bead streams in the bead feeding unit move at the speed $\omega 3$.

A method according to the invention is characterized in that the ratio of the sum of the speeds $\omega 1$ and $\omega 3$ to the speed $\omega 2$ is equal to the ratio of the distance s1 between the holding pockets to the distance s2 between the receiving pockets and is an integer.

The subject matter of the invention is also a device for feeding of the beads to a filter manufacturing machine comprising a bead container, a bead feeding unit provided with a plurality of channels supplying a plurality of bead streams, a bead transfer unit, where the beads are transferred from holding pockets of the bead transfer unit to receiving pockets of the bead transfer unit. According to the invention, the device comprises movable, moving at the speed $\omega 1$, feeding means in the unit for feeding the beads to the bead transfer unit and movable, moving at the speed $\omega 2$, guiding means for the distribution of the beads in the bead transfer unit.

A device according to the invention is characterized in that the movable feeding means for transferring the beads from the holding pockets in the unit feeding beads to the receiving pockets of the bead transfer unit is a cam.

A device according to the invention is characterized in that the movable guiding means for bead distribution in the bead transfer unit is a guiding plate.

A device according to the invention is characterized in that the speed $\omega 1$ of the movable feeding means of the bead feeding unit is greater than the speed $\omega 2$ of the movable guiding means of the bead transfer unit.

A device according to the invention is characterized in that the ratio of the speeds $\omega 1$ to $\omega 2$ is equal to the ratio of the distance s1 between adjoining holding pockets to the distance s2 between adjoining receiving pockets.

A device according to the invention is characterized in that the ratio of the speeds $\omega 1$ to $\omega 2$ equal to the ratio of the distance s1 between the holding pockets to the distance s2 between the receiving pockets is equal to an integer.

A device according to the invention is characterized in that the channel supplying a plurality of bead streams in the bead feeding unit moves at the speed $\omega 3$.

A device according to the invention is characterized in that the ratio of the sum of the speeds $\omega 1$ and $\omega 3$ to the speed $\omega 2$ is equal to the ratio of the distance s1 between the holding pockets to the distance s2 between the receiving pockets and is an integer.

A device according to the invention guarantees that each position of a bead after leaving the supply channel on the way to the filter material is fully controlled.

BRIEF DESCRIPTION OF THE DRAWINGS

The object of the invention is shown in a preferred embodiment in a drawing in which.

DETAILED DESCRIPTION OF THE DRAWINGS

Figure 1:
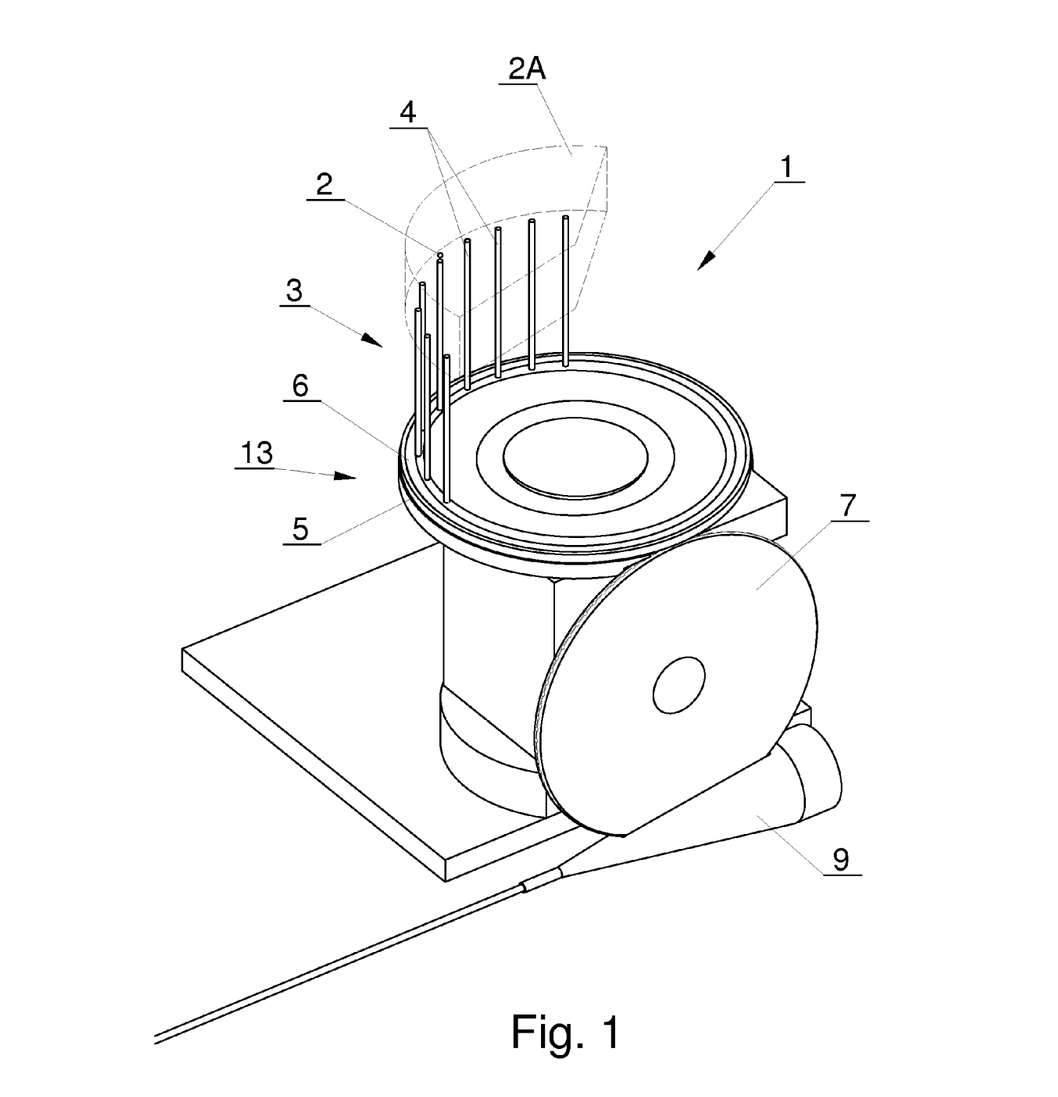
FIG. 1 shows a bead feeder in a perspective view.

FIG. 1 shows a feeder 1 for beads 2 provided with a storage container 2A for beads 2, a bead stream feeding unit 3, a unit 13 for transferring the beads to a delivery wheel 7 and the delivery wheel 7 feeding the beads 2 into the filter material conveyed along a funnel 9. For reasons of simplification, the elements fastening individual units have not been shown.

The beads 2 feeding unit 3 is provided with a plurality of stationary channels in the form of tubes 4 to which beads 2 are supplied from the container 2A, whereas one bead 2 above the inlet of one of the tubes has been shown. At the outlets of the tubes 4 are situated first holding pockets 14 (FIG. 3) from which the beads are transferred to second bead receiving pockets 18 (FIG. 4) situated in the area between a first guiding plate 5 and a second guiding plate 6, where the guiding plates 5 and 6 belong to the unit 13 for transferring the beads 2 to the delivery wheel 7. After passing through a guiding channel 19 between the plate 5 and the plate 6, the beads 2 are transferred further and placed into the pockets on the circumference of the delivery wheel 7 which places the beads 2 into the filter material conveyed in the funnel 9 (FIG. 1).

Figure 2:
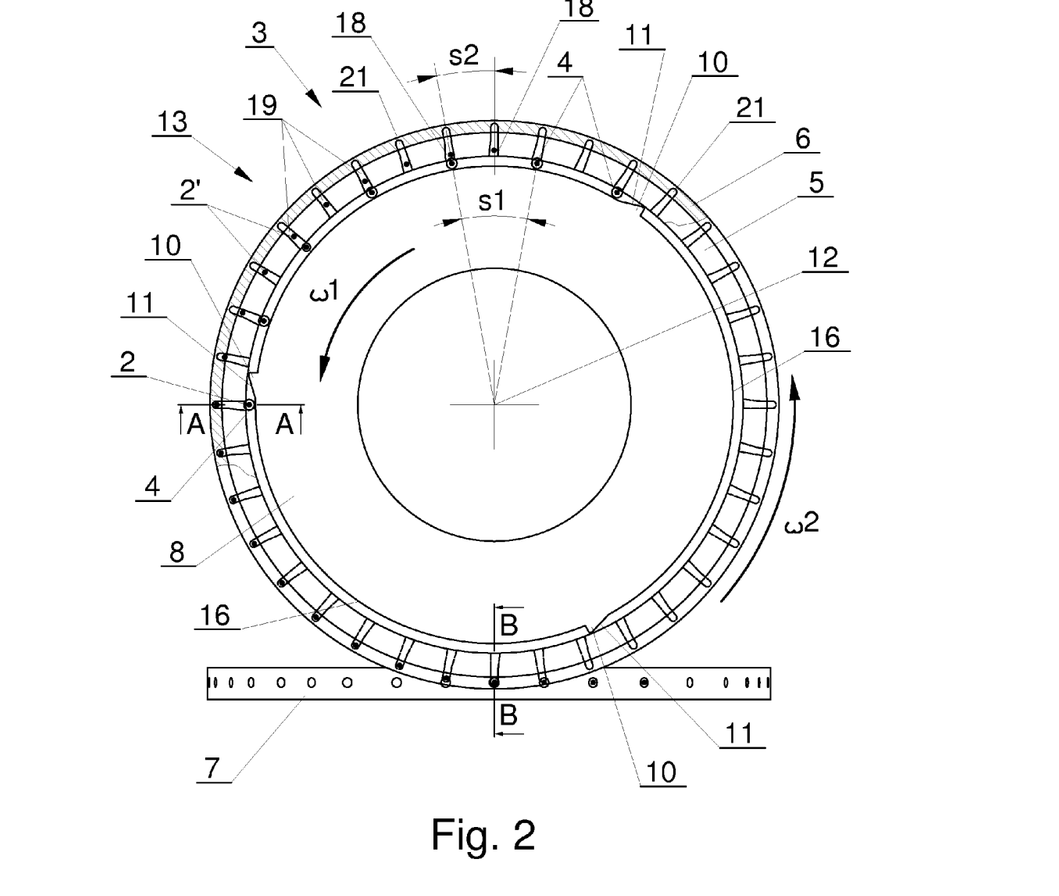
FIG. 2 shows a fragment of a bead feeder in a first embodiment in a top view.

FIG. 2 shows a fragment of the bead feeder 1 according to the invention in the first embodiment. In a top view, the bead 2 feeding unit 3 and the unit 13 for transferring the beads 2 to the delivery wheel 7 are shown. The bead feeding unit 3 is provided with a plurality of tubes 4, whereas all tubes 4 are filled with the beads 2 (in view of proportionally small dimensions of the beads, in the drawing they have been shown in the form of shaded small circles). For reasons of simplification, the elements fastening the tubes 4 to the frame of the feeder 1 and the drive elements have not been shown. The bead feeding unit 3 is provided with rotatable feeding means in the form of a cam 8 comprising pushing segments 10 having pushing edges 11, whereas the cam 8 rotates at a speed $\omega 1$ around the axis of rotation 12, and the pushing segments 10 move along a circular path in the area of the outlets of the tubes 4. In the embodiment shown the guiding channels 19 together with the pockets 18 are situated in the plate 6 which rotates at the speed $\omega 2$ lower than the speed $\omega 1$. During the operation of the bead feeder, the segments 10 disposed on the rotating cam 8 cause pushing of the beads 2 into the pockets 18 situated at the beginning of the guiding channels 19, whereas the speeds $\omega 1$ and $\omega 2$ and the initial position are chosen in such a way that during the work of the unit the pushing segments 10 cause pushing of the beads into successive pockets 18 in the guiding channels 19, which can be achieved when the guiding channel 19 is situated relative to the outlet of the tube 4 and the first holding pocket 14 in such a way that renders transferring of the bead 2 possible, for example the pocket 18 receiving the bead is situated substantially radially to the holding pocket 14. The unit is shown in a situation where several beads 2 have been placed in the guiding channels 19. The rotational speed $\omega 1$ of the cam 8 can be for example twice bigger than the rotational speed $\omega 2$ of the plate 6. In this way the beads situated in the tubes 4 spaced at angular distances s1 can be fed to more densely spaced receiving pockets 18 which are spaced at angular distances s2, whereas the distance s1 is an angular distance between adjoining holding pockets 14, and the distance s2 is an angular distance between adjoining receiving pockets 18. In the embodiment, for the speed $\omega 1$ being twice bigger than the speed $\omega 2$, the angular distance s1 between the supply tubes 4 is twice bigger than the angular distance s2 between the pockets 18 receiving the beads 2 from the pockets 14. Other embodiments are possible, where for example the rotational speed $\omega 1$ of the cam 8 is three times bigger than the rotational speed $\omega 2$ of the receiving pockets 18, then proportionally the angular distance s1 between adjoining tubes 4 has to be three times bigger than the angular distance s2 of the receiving pockets 18. The device can be constructed in a similar way when the proportions of respective speeds and distances are equal to successive integers.

Figure 3:
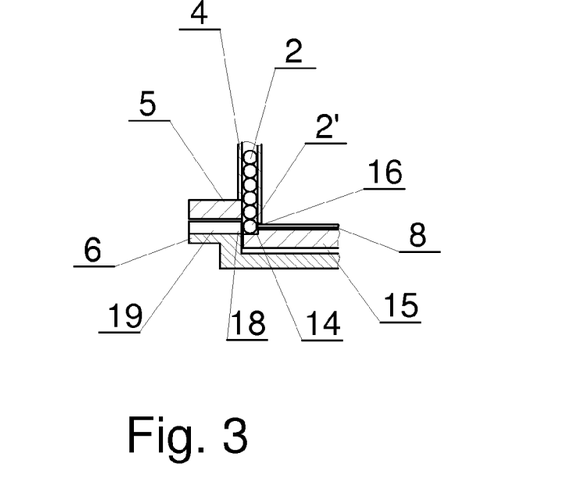
FIG. 3 shows a sectional view of a holding pocket, marked as A-A in FIG. 2, before pushing a bead out of the holding pocket.

FIG. 3 shows a sectional view of any tube 4, where for example in FIG. 2 the section was marked as A-A. The lowermost bead 2' in the bead 2 column is situated in the holding pocket 14 disposed at the outlet of the tube 4, limited from below by a plate 15, and on the sides by the plate 5 and a circumferential edge 16 of the cam 8.

Figure 4:
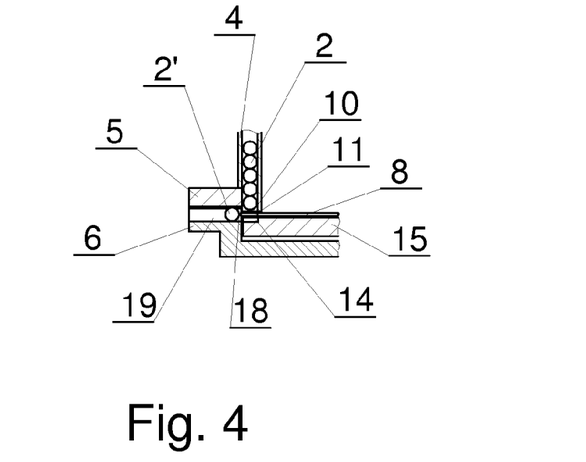
FIG. 4 shows a sectional view of the holding pocket, marked as B-B in FIG. 5a, after transferring a bead to a receiving pocket.

FIG. 4 shows a sectional view of the tube 4 in a situation where the pushing segment 10 during the rotation of the cam 8 has passed a successive pocket 14 beneath a successive tube 4 and caused pushing the bead 2' out of the pocket 14 to the pocket 18 in the area between the first guiding plate 5 and the second guiding plate 6. Then the bead 2' is transferred substantially horizontally in the guiding channel 19, picked up from it and transferred to the delivery wheel 7. An inclination of the guiding channel 19 is also possible, which can be achieved by a conical shape of the guiding plates 5 and 6.

Figure 5A:
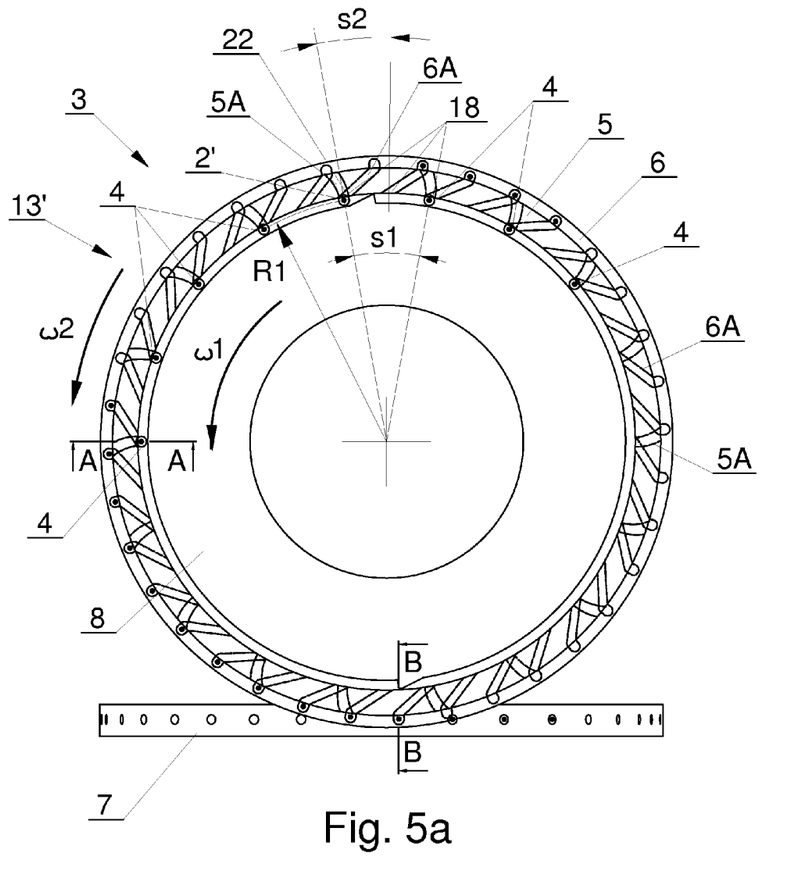
FIGS. 5a to 5d show a fragment of a bead feeder in the first embodiment in a top view at successive bead transfer stages.

FIG. 5a shows a fragment of the bead feeder 1 according to the invention in the second embodiment. In a top view, a fragment of the bead 2 feeding unit 3 and the unit 13 for transferring the beads 2 to the delivery wheel 7 has been shown. The unit 3 is provided with a plurality of tubes 4 (on an arc of the radius R1), whereas all tubes 4 are filled with the beads 2 (in view of proportionally small dimensions of the beads, in the drawing they have been shown in the form of shaded small circles). For reasons of simplification, the elements fastening the tubes 4 to the frame of the feeder 1 and the drive elements have not been shown. At the outlets of the tubes 4 are situated first holding pockets 14 (FIG. 6) from which the beads are transferred to second receiving pockets 18 belonging to the unit 13' for transferring the beads 2 to the delivery wheel 7, situated in the area of the guiding plates (5, 6) between the first guiding plate 5 and the second guiding plate 6. After passing through the substantially horizontal guiding channel 19 between the guiding plate 5 and the guiding plate 6, and then downward through the channel 21 (FIG. 7), the beads 2 are transferred further to the pockets on the circumference of the delivery wheel 7 which places the beads 2 into the filter material conveyed in the funnel 9 (FIG. 1). The guiding channel 19 is formed of two parts, where the guiding channel 19 should be considered as a path which the bead 2' covers between the receiving pocket 18 and the substantially vertical channel 21 being an extension of the guiding channel 19 from where the bead is fed to the delivery wheel 7. The upper part of the guiding channel 19 is defined by a guiding groove 5A shaped on the bottom side of guiding plate 5 oriented towards the guiding plate 6, the lower part of the guiding channel 19 is defined by a guiding groove 6A shaped on the top side of the guiding plate 6 oriented towards the guiding plate 5, whereas the grooves 5A and 6A intersect.

The bead feeding unit 3 is provided with rotatable feeding means in the form of a cam 8 comprising pushing segments 10 having pushing edges 11, whereas the cam 8 rotates around the axis of rotation 12 at the speed ω1. The plate 5 is stationary, whereas the second plate 6 is rotatable and rotates around the axis of rotation 12 at the speed ω2 lower than the speed ω1 of the cam 8. The guiding grooves 5A and 6A of both guiding plates 5 and 6 are shown in broken lines. At the intersection of the grooves 5A and 6A forms a guiding chamber 21 which in view of the rotation of the plate 6 moves so that the distance of the guiding chamber 22 to the axis of rotation 12 increases. In other words, the beads 2 are distributed so that they can be at an increasingly greater distance to the axis of rotation 12, finally, in the embodiment shown the beads are distributed horizontally along a circle of the radius R2 (FIG. 5d).

During the operation of the bead feeder the segments 10 disposed on the rotating cam 8 cause pushing of successive beads 2 into the receiving pockets 18 situated at the beginning of the guiding channels 19 from successive holding pockets, whereas at the moment of pushing a bead 2' out of the holding pocket 14 the receiving pocket 18 overlaps with the chamber 22 formed as a result of the intersection of the grooves 5A and 6A. The unit is shown in a situation where a certain number of the beads 2 has been placed in the channels 21. In the embodiment shown the rotational speed ω1 of the cam 8 is twice bigger than the rotational speed ω2 of the plate 6. In this way the beads situated in the tubes 4 spaced at angular distances s1 can be fed to more densely spaced receiving pockets 18 which are spaced at angular distances s2. In the embodiment, for the speed ω1 being twice bigger than the speed ω2, the angular distance s1 between the supply tubes 4 is twice bigger than the angular distance s2 between the pockets 18 receiving the beads 2 from the pockets 14. Other embodiments are possible, where for example the rotational speed ω1 of the cam 8 is three times bigger than the rotational speed ω2 of the receiving pockets 18, then proportionally the angular distance s1 between adjoining tubes 4 has to be three times bigger than the angular distance s2 of the receiving pockets 18. The device can be constructed in a similar way when the proportions of respective speeds and distances are equal to successive integers.

Figure 6:
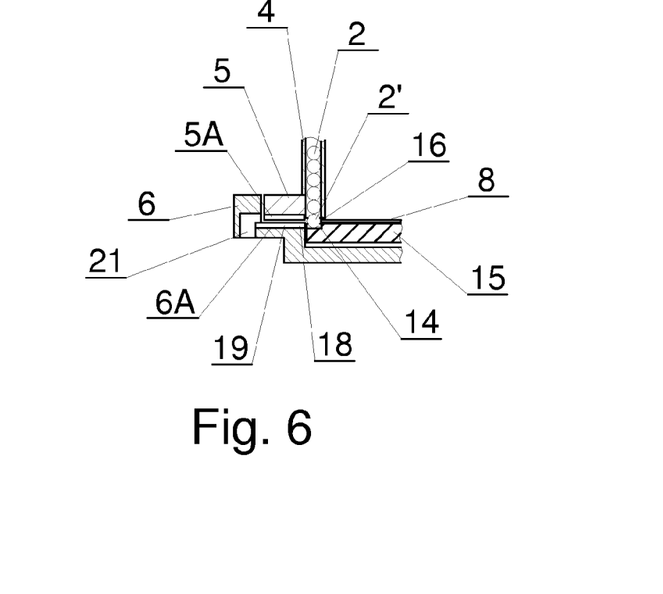
FIG. 6 shows a sectional view of a holding pocket in a first embodiment of a guiding channel, marked as B-B in FIG. 5a, before pushing a bead out of the holding pocket.

FIG. 6 shows a sectional view of any tube 4, where for example in FIG. 5a the section was marked as A-A. The lowermost bead 2' in the bead column is situated in the holding pocket 14 disposed at the outlet of the tube 4, limited from below by the plate 15, and on the sides by the plate 5 and the circumferential edge 16 of the cam 8.

Figure 7:
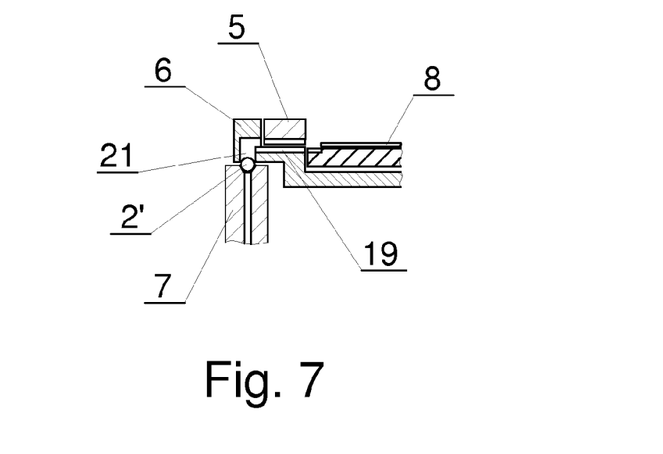
FIG. 7 shows a sectional view of a holding pocket in a second embodiment of the guiding channel, marked as B-B in FIG. 5a, after transferring a bead to a delivery wheel.

FIG. 7 shows a situation where the working segment 10 during the rotation of the cam 8 has passed a successive pocket 14 beneath a successive tube 4 and caused pushing the bead 2' out of the pocket, then the said bead has passed through the pocket 18 and was transferred substantially horizontally in the guiding channel 19 being the path of movement of the guiding chamber 21, and then downward to the delivery wheel 7 on which it is held, for example by vacuum.

Figure 5B:
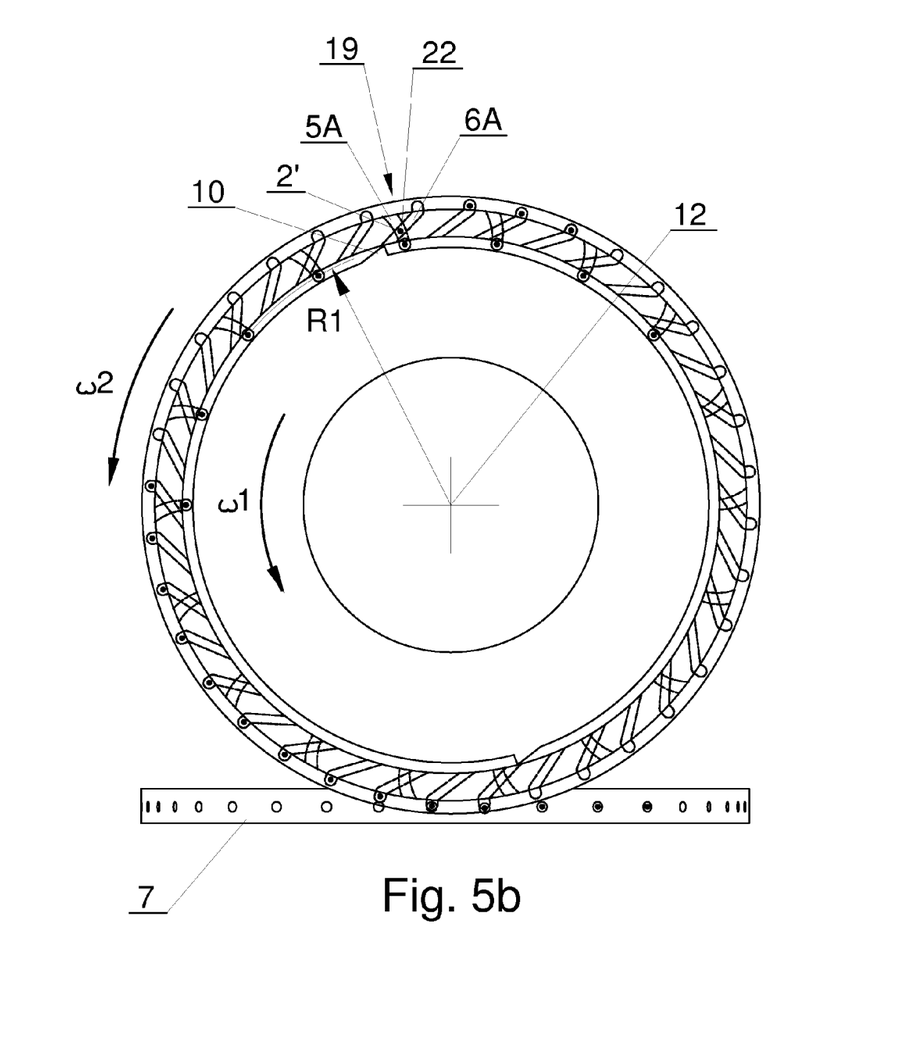
Figure 5C:
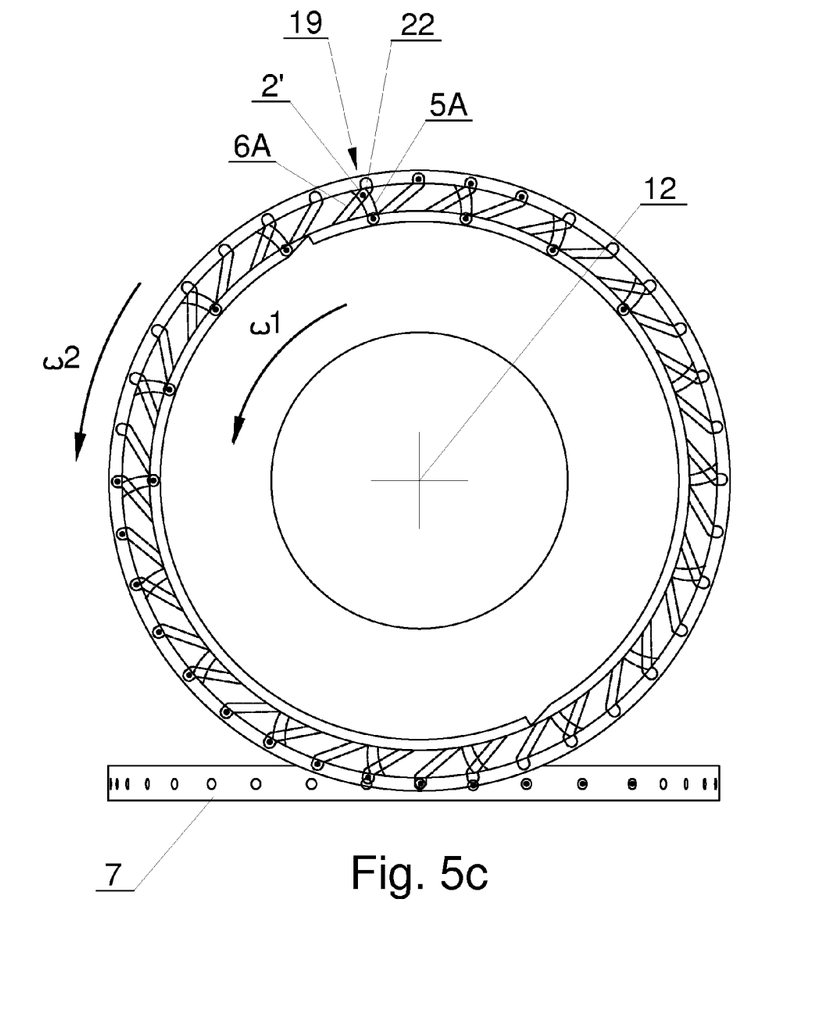
Figure 5D:
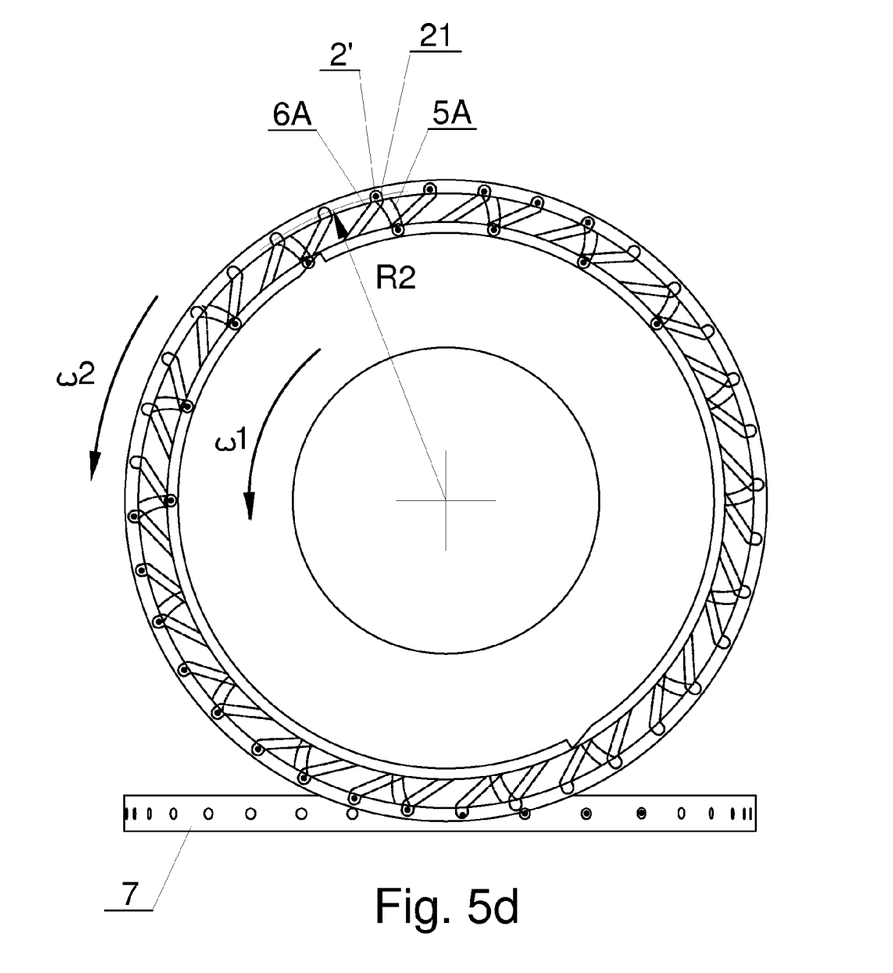

FIGS. 5a, 5b, 5c and 5d show successive stages of the movement of the bead 2' in the guiding chamber along the guiding channel 19 (path of movement of the bead) in the first embodiment. In FIG. 5a the pushing segment 10 is in a position right in front of the bead 2', whereas the guiding chamber 22 at the intersection of the grooves 5A and 6A begins to form. In FIG. 5b the segment 10 has passed the bead 2' and caused that it was pushed into the chamber 22 which with the rotation of the plate 6 and the groove 6A begins to move away from the axis of rotation 12. In FIG. 5c the bead 2' still remains in the guiding chamber 22 just before feeding it to the channel 21. In FIG. 5d the bead 2' has been placed in the channel 21, it will move further with the channel 21 moving along a circle of the radius R2 and rotating with the guiding plate 6, and can be fed to the delivery wheel 7.

In another embodiment of the device according to the invention the guiding grooves 5A and 5B can be shaped as grooves with vacuum supplied. Such solution ensures that a bead does not rub against side edges of the groove and is sort of rolled along the groove.

Figure 8:
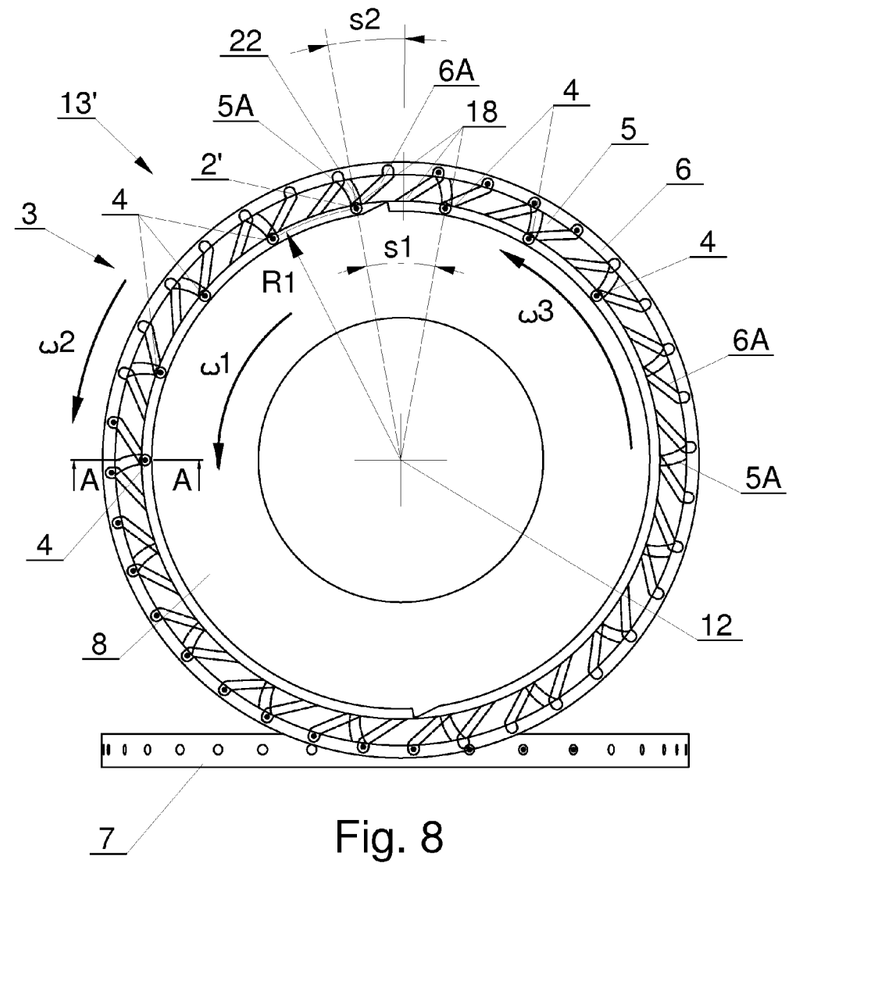
FIG. 8 shows a fragment of a bead feeder in a second embodiment in a top view.

FIG. 8 shows a fragment of the bead feeder according to the invention in the second embodiment in top view. In this embodiment, in the unit feeding a plurality of bead streams the bead stream transfer channels in the form of the tubes 4 are designed as rotatable around the axis of rotation 12. The tubes 4 move at the rotational speed ω3 in order to give an initial velocity of bead 2 before starting the transfer of the beads 2 from the holding pockets 14 to the receiving pockets 18. According to the invention, for the rotational speeds ω1 of the feeding means 3 of the bead 2 feeding unit 3 and the speeds ω2 of the guiding means 6 of the bead 2 transfer unit, the ratio of the sum of the speeds ω1 and ω3 to the speed ω2 is equal to the ratio of the distance s1 between the holding pockets 14 to the distance s2 between the receiving pockets 18 and is an integer.

The invention claimed is:

1. A method of feeding beads (2) to a filter manufacturing machine comprising a container (2A) for beads (2), a bead feeding unit (3) provided with bead streams supply channels (4), a bead transfer unit (13) in a tobacco industry system, where the beads from holding pockets (14) of the bead feeding unit (3) are delivered to receiving pockets (18) of the bead transfer unit (13), comprising the steps of
   supplying beads from the bead container (2A) to a plurality of channels (4) of the bead feeding unit (3) comprising the holding pockets (14);
   feeding beads from the holding pockets (14) of the bead feeding unit (3) to the receiving pockets (18) of the bead transfer unit (13) and to a delivery wheel by means of movable feeding means (8);
   picking up beads from the receiving pockets (18) by means of movable guiding means (5, 6).

2. The method as in claim 1 wherein beads (2) are fed by a cam (8).

3. The method as in claim 2 wherein the ratio of the speeds (ω1) to (ω2) equal to the ratio of the distance (s1) between adjoining holding pockets (14) to a distance (s2) between adjoining receiving pockets (18).

4. The method as in claim 1 wherein beads (2) are picked up by a guiding plate (5, 6).

5. The method as in claim 1 wherein the speed ($\omega 1$) of the movable feeding means (8) of the bead feeding unit (3) is greater than the speed ($\omega 2$) of the movable guiding means (5, 6) of the bead transfer unit (13).

6. The method as in claim 5 wherein the ratio of the speeds ($\omega 1$) to ($\omega 2$) is equal to the ratio of a distance (s1) between adjoining holding pockets (14) to a distance (s2) between adjoining receiving pockets (18).

7. The method as in claim 1 wherein the channels (4) supplying a plurality of streams of beads (2) in the bead feeding unit (3) move at the speed ($\omega 3$).

8. The method as in claim 7 wherein the ratio of the sum of speeds ($\omega 1$) and ($\omega 3$) to the speed ($\omega 2$) is equal to the ratio of the distance (s1) between the holding pockets (14) to the distance (s2) between the receiving pockets (18) and is an integer.

9. A bead (2) feeder for delivering beads to a filter manufacturing machine comprising a container (2A) for beads (2), a bead feeding unit (3) provided with a plurality of channels (4) supplying a plurality of bead streams, a bead transfer unit (13), where the beads are transferred from holding pockets (14) of the bead feeding unit (3) to receiving pockets (18) of the bead transfer unit (13), wherein
the bead feeder comprises movable feeding means (8) adapted to the operation at a speed ($\omega 1$) in the bead feeding unit (3) to the bead transfer unit (13) and movable guiding means (5, 6) adapted to the operation at a speed ($\omega 2$) for distributing of the beads in the bead transfer unit (13).

10. The bead feeder as in claim 9 wherein the movable feeding means (8) for transferring the beads (2) from the holding pockets (14) in the bead feeding unit (3) to the receiving pockets (18) of the bead transfer unit (13) is a cam (8).

11. The bead feeder as in claim 9 wherein the movable guiding means (5, 6) for distributing of the beads (2) in the bead transfer unit (13) is a guiding plate (5, 6).

12. The bead feeder as in claim 9 wherein the speed ($\omega 1$) of the movable feeding means (8) of the bead feeding unit (3) is greater than the speed ($\omega 2$) of the movable guiding means (5, 6) of the bead transfer unit (13).

13. The bead feeder as in claim 9 wherein the ratio of the speeds ($\omega 1$) to ($\omega 2$) is equal to the ratio of the distance (s1) between adjoining holding pockets (14) to the distance (s2) between adjoining receiving pockets (18).

14. The bead feeder as in claim 9 wherein the ratio of the speeds ($\omega$) to ($\omega 2$) equal to the ratio of the distance (s1) between the holding pockets (14) to the distance (s2) between the receiving pockets (18) is equal to an integer.

15. The bead feeder as in claim 9 wherein the channels for supplying a plurality of bead (2) streams in the bead feeding unit (3) move at the speed ($\omega 3$).

16. The bead feeder as in claim 15 wherein the ratio of the sum of the speeds ($\omega 1$) and ($\omega 3$) to the speed ($\omega 2$) is equal to the ratio of the distance (s1) between the holding pockets (14) to the distance (s2) between the receiving pockets (18) and is an integer.

* * * * *